United States Patent
Cassel et al.

(10) Patent No.: US 10,030,651 B1
(45) Date of Patent: Jul. 24, 2018

(54) SUBMERSIBLE LANDFILL PUMP

(71) Applicant: Q.E.D. Environmental Systems, Inc., Dexter, MI (US)

(72) Inventors: Mitchal Cassel, Redlands, CA (US); Jamie Tooley, Beaumont, CA (US); Scott Marcell, Banning, CA (US)

(73) Assignee: Q.E.D. Environmental Systems, Inc., Dexter, MI (US)

( * ) Notice: Subject to any disclaimer, the term of this patent is extended or adjusted under 35 U.S.C. 154(b) by 539 days.

(21) Appl. No.: 14/629,389

(22) Filed: Feb. 23, 2015

Related U.S. Application Data (60) Provisional application No. 61/943,919, filed on Feb. 24, 2014.

(51) Int. Cl.
| | |
|---|---|
| *F16K 31/18* | (2006.01) |
| *F04B 53/14* | (2006.01) |
| *B09C 1/00* | (2006.01) |
| *F04B 39/00* | (2006.01) |
| *F16K 31/24* | (2006.01) |

(52) U.S. Cl.
CPC ............ *F04B 53/145* (2013.01); *B09C 1/005* (2013.01); *F04B 39/0027* (2013.01); *F16K 31/18* (2013.01); *F16K 31/24* (2013.01)

(58) Field of Classification Search
CPC ................................. F16K 31/24; F16K 31/18
See application file for complete search history.

(56) References Cited

U.S. PATENT DOCUMENTS

| | | | | |
|---|---|---|---|---|
| 487,305 | A | * 12/1892 | Auken | ...................... F02M 5/12 137/168 |
| 1,681,553 | A | * 8/1928 | Netterman | .............. F16K 31/24 417/133 |
| 3,929,155 | A | * 12/1975 | Garretson | ............... F16K 31/18 137/430 |
| 4,892,658 | A | 1/1990 | Martin et al. | |
| 5,074,758 | A | 12/1991 | McIntyre | |
| 5,358,037 | A | 10/1994 | Edwards et al. | |
| 5,358,038 | A | 10/1994 | Edwards et al. | |
| 5,470,206 | A | 11/1995 | Breslin | |
| 5,495,890 | A | 3/1996 | Edwards et al. | |
| 5,525,042 | A | 6/1996 | Batten | |
| 5,549,157 | A | 8/1996 | Johnson et al. | |
| 5,611,671 | A | 3/1997 | Tripp | |
| 5,611,672 | A | 3/1997 | Modesitt | |
| 5,662,460 | A | 9/1997 | Modesitt | |
| 5,672,050 | A | 9/1997 | Webber et al. | |
| 5,725,026 | A | 3/1998 | Maimets | |
| 5,938,409 | A | 8/1999 | Radle et al. | |
| 5,941,691 | A | 8/1999 | Stephens | |
| 5,944,490 | A | 8/1999 | Breslin | |
| 6,039,546 | A | 3/2000 | Edwards et al. | |
| 6,045,336 | A | 4/2000 | Webb et al. | |

(Continued)

FOREIGN PATENT DOCUMENTS

| | | |
|---|---|---|
| CN | 102235028 | 11/2011 |
| WO | WO1998020232 A1 | 5/1998 |
| WO | WO2008005437 A2 | 1/2008 |

*Primary Examiner* — F. Daniel Lopez
(74) *Attorney, Agent, or Firm* — Kinney & Lange, P.A.

(57) ABSTRACT

A submersible landfill pump system is disclosed which comprises a damper actuation mechanism that includes a rocker assembly and a float rod assembly comprising one or more dampeners.

20 Claims, 3 Drawing Sheets

(56) References Cited

U.S. PATENT DOCUMENTS

| | | |
|---|---|---|
| 6,056,876 A | 5/2000 | Yamasaki et al. |
| 6,095,759 A | 8/2000 | Breslin |
| 6,146,104 A | 11/2000 | Mastroianni et al. |
| 6,224,343 B1 | 5/2001 | Newcomer |
| 6,283,676 B1 | 9/2001 | Hater et al. |
| 6,478,552 B1 | 11/2002 | Batten et al. |
| 6,582,205 B2 | 6/2003 | Batten et al. |
| 6,676,837 B2 | 1/2004 | Keeton |
| 7,316,544 B2 | 1/2008 | Vidrine |
| 8,551,341 B2 | 10/2013 | Conner et al. |
| 8,679,339 B2 | 3/2014 | Kuang et al. |
| 2003/0159988 A1 | 8/2003 | Daigger et al. |
| 2005/0201831 A1 | 9/2005 | Lee et al. |
| 2014/0110099 A1 | 4/2014 | Colby |
| 2014/0182846 A1 | 7/2014 | Fischer et al. |
| 2015/0118068 A1 | 4/2015 | Strunk et al. |

\* cited by examiner

SUBMERSIBLE LANDFILL PUMP

CROSS-REFERENCE TO RELATED APPLICATIONS

This application claims the benefit of U.S. Provisional Patent Application Ser. No. 61/943,919, which was filed on Feb. 24, 2014, and entitled "Submersible Landfill Pump." The disclosure of the foregoing application is hereby incorporated by reference in its entirety.

BACKGROUND

Most landfill gas is produced by biodegradation, which occurs when organic waste is broken down by bacteria naturally present in the waste and in the soil used to cover the landfill. Landfill gas is mostly made of methane, carbon dioxide, and trace amount of a wide variety of volatile organic compounds.

Landfill gases can contribute to ozone formation, atmospheric photochemical reaction, and other types of air pollution. Landfill gases can also create dangerous conditions. For example, if methane is present in the air at higher concentrations, it can be explosive. Landfill gases may also contribute to water pollution if it migrates and comes in contact with groundwater. Therefore, it is desirable to collect landfill gas to prevent these dangers. Collected landfill gases can be used as a source of power generation, or be incinerated before being released into the atmosphere.

Landfill sites can sometimes be filled with liquid. Excessive levels of liquid can reduce gas extraction efficiency drastically. In order to ensure efficient extraction of landfill gases, such liquid needs to be pumped out of the landfill site.

SUMMARY

The present technology relates to submersible landfill pump systems and, in particular, submersible landfill pump systems having a damper actuation mechanism. As noted above, excess liquid can reduce gas extraction capacity of a well. Thus, extraction of liquid may be performed through drilling a well into a location in the landfill, and inserting a submersible landfill pump through the well. The submersible landfill pump may be connected via sheathed tubing that extends from above the surface of the landfill to the landfill pump. The tubing can transport liquid from the pump to the surface of the landfill, and supply air to the interior of the pump. A portion of the submersible landfill pump can have fluid inlet structure. This portion of the pump can become submerged in liquid inside the well, so that the liquid can enter the interior of the pump. The pump then extracts liquid from the inside of the pump through a discharge pipe connected to the tubing, which can include more than one tube. A separate tube may be used to supply or extract air to and from the pump from above the landfill surface.

Wells and pumps used to extract water from the wells can easily become expensive. For example, the landfill may include waste that can be hard to drill through. Also, the landfill site may need to be drilled to a significant depth, in order to achieve a desired depth for liquid extraction. A large number of wells may need to be installed within the landfill site to ensure efficient landfill gas extraction. This, in turn, requires a large number of pumps to be used within the wells. Therefore, submersible landfill pumps should be relatively simple, inexpensive, and should fit in a small diameter well due to the increased cost of drilling large diameter wells. Ideally, such pumps are also suited for long term use, without requiring too much maintenance, adjustment, or replacement.

A landfill gas extraction site can present several issues over time. The rate of bioactivity within the landfill site may gradually decrease. Subsurface shifting of landfill can occur, which may trap liquid in some parts of the landfill gas extraction site. Subsurface shifting of landfill may also affect the level of bioactivity. For example, a landfill site may have little to no bioactivity around 75 feet below surface, but may have bioactivity around 25 feet below surface. Presence of liquid can be detected by detecting the pressure within the submersible pump. Bioactivity of a landfill site can be detected by the temperature within the well. For example, a temperature of around 75° F. can indicate that there's sufficient bioactivity to place a pump. Temperature substantially below 75° F. may indicate that there is little to no bioactivity within the depth range.

Self-actuating pumping systems have been used to extract liquid from a landfill gas extraction site. Such self-actuating pumping systems can use a float actuating mechanism, which actuates a pump valve based on the level of liquid inside the pump. The float actuating mechanism can be preset to discharge liquid at a fixed rate without manual adjustment.

Self-actuating pumps generally provide increased efficiency and cost savings. However, self-actuating pumps may have limited lifespan. For example, subsurface shifting of landfill masses can cause kinks to the well piping and the pump. Repeated impact from opening and closing of the valve can bend or break components of the pump, such as the guiding rod used to open or close the valve. In order to replace an inoperable pump, a technician would have to first detect that a pump is inoperable, and then get approval from an off-site engineer. This can further affect the efficiency and cost of operation.

Existing submersible pumps may also have inaccurate pumping rate. Sometimes the float operated valve may not open or close definitively, which results in leakage or introduction of unwanted air to pump. Float actuation mechanisms require pumps to be larger. Larger size can make pumps expensive, as well as expose pumps to more impact and stress.

Thus, a need exists for a submersible landfill pump system that is accurate and can be used long-term. Also, a need exists for a submersible landfill pump system that allows a technician to detect subsurface conditions from the outside. Accordingly, described herein are various submersible landfill pump improvements and features. Some technical solutions discussed herein are in response to the realization that existing submersible landfill pump systems do not provide a mechanism to reduce impact from repeated opening and closing of the valve

BRIEF DESCRIPTION OF THE DRAWINGS

The above-mentioned aspects, as well as other figures, aspects, and advantages of the present technology will now be described in connection with various embodiments, with reference to the accompanying drawings. The illustrated embodiments, however, are merely examples and are not intended to be limiting.

DETAILED DESCRIPTION

The systems, methods and devices described herein have innovative aspects, no single one of which is indispensable or solely responsible for their desirable attributes. Without limiting the scope of the claims, some of the advantageous features will now be summarized.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, illustrated in the figures, can be arranged, substituted, combined, and designed in a wide variety of different configurations, all of which are explicitly contemplated and form part of this disclosure. For example, a system or device may be implemented or a method may be practiced using any one of the aspects set forth herein. In addition, such a system or device may be implemented or such a method may be practiced using other structure, functionality, or structure and functionality in addition to or other than one or more of the aspects set forth herein. Alterations in further modifications of the features illustrated herein, and additional applications of the principles of the disclosures as illustrated herein, which would occur to one skilled in the relevant art and having possession of this disclosure, are to be considered within the scope of the disclosure.

Descriptions of the necessary parts or elements may be omitted for clarity and conciseness, and like reference numerals refer to like elements throughout. In the drawings, the size and thickness of layers and regions may be exaggerated for clarity and convenience.

Embodiments described herein generally relate to systems, devices, and methods related to submersible landfill pump systems. More specifically, some embodiments relate to submersible landfill pump systems having a damper actuation mechanism.

Submersible Landfill Pump

Figure 1:
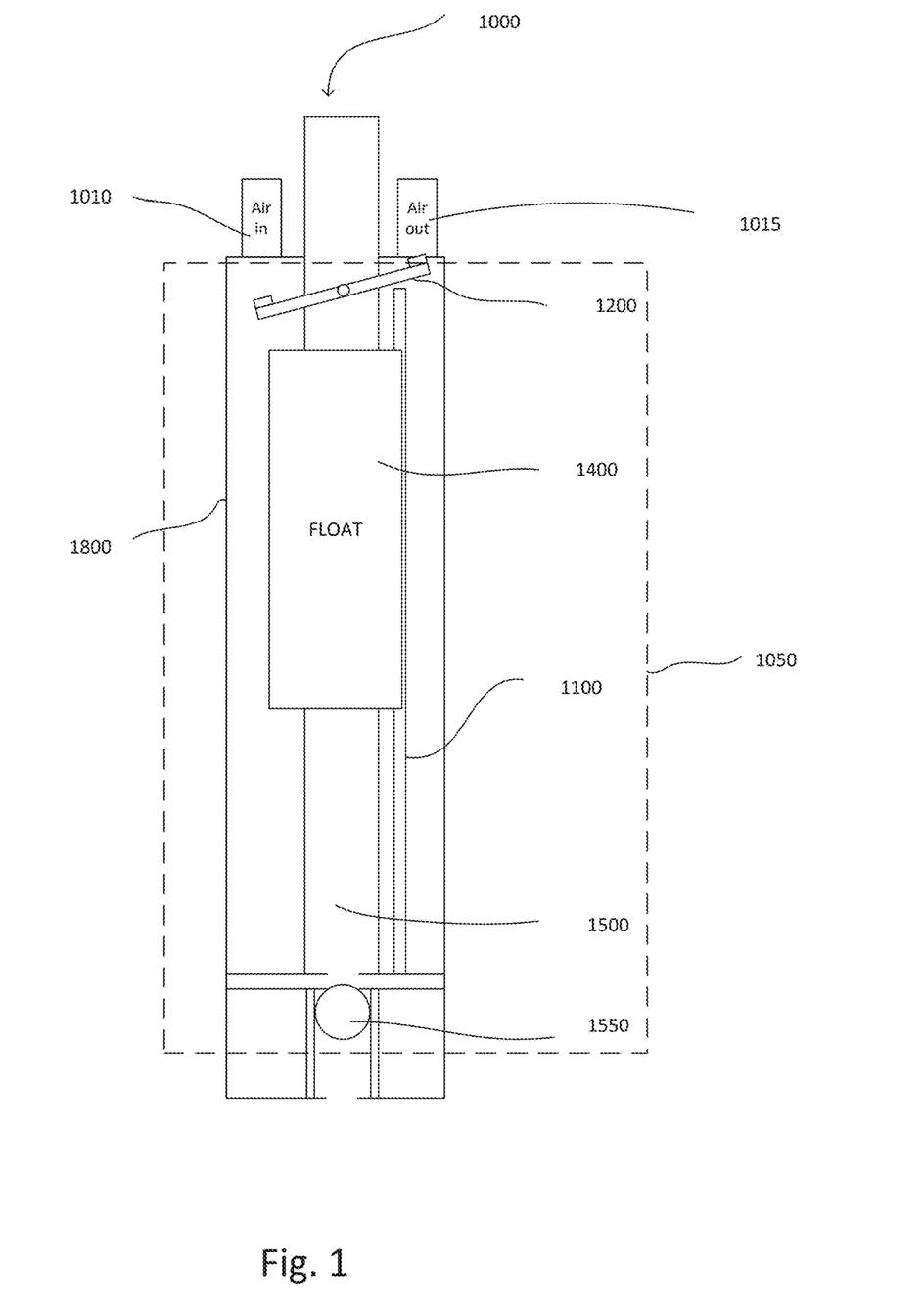
FIG. 1 is a schematic drawing of an exemplary submersible landfill pump.

FIG. 1 is a schematic drawing of an exemplary submersible landfill pump. As noted above, an operating goal of submersible landfill pumps is to avoid the necessity of external controllers by incorporating sensing means within the pump to detect when a water level within the pump has reached a certain level. Therefore, in the embodiment of FIG. 1, the submersible landfill pump system 1000 includes a float actuation mechanism 1050 within a pump casing. The float actuation mechanism 1050 can include a float rod 1100, a rocker assembly 1200, a float 1400, a discharge tube 1500, and a check ball 1550. In other embodiments, a float actuation mechanism may include a portion of these components, similar components, and/or additional components.

In some embodiments, groundwater from landfills can enter the pump from outside of the casing. Increase in water level inside the pump can raise the float 1400 to actuate the rocker assembly 1200, thereby letting air from outside of the pump to enter the interior of the pump 1000. For example, in some embodiments a tube is connected to the Air In connection 1010 on the top of pump 1000 and is connected on the opposite and outside of the well to a pressurized air source, such as may be provided by an air compressor or series of air compressors. When the Air In port 1010 become unblocked by the rocker assembly 1200 (in response to the float rod 1100 pushing the rocker arm 1200 on the side opposite a central axis as the water level inside the pump rises and causes the float 1400 to correspondingly rise), pressurized air enters the pump and creates a pressure which forces the check ball 1550 downward to enable water to escape through the discharge tube 1500 up to the landfill surface. The float actuation mechanism 1050 is preset to open at a desired level of pressure inside the pump 1000. For example, the float actuation mechanism 1050 can be configured to actuate the rocker assembly 1200 at about 30 psi. Depending on the embodiment, the float can be configured to a given buoyancy to adjust the level at which the float actuates the rocker assembly 1200.

Damper Actuation Mechanism

Figures 2A, 2B:
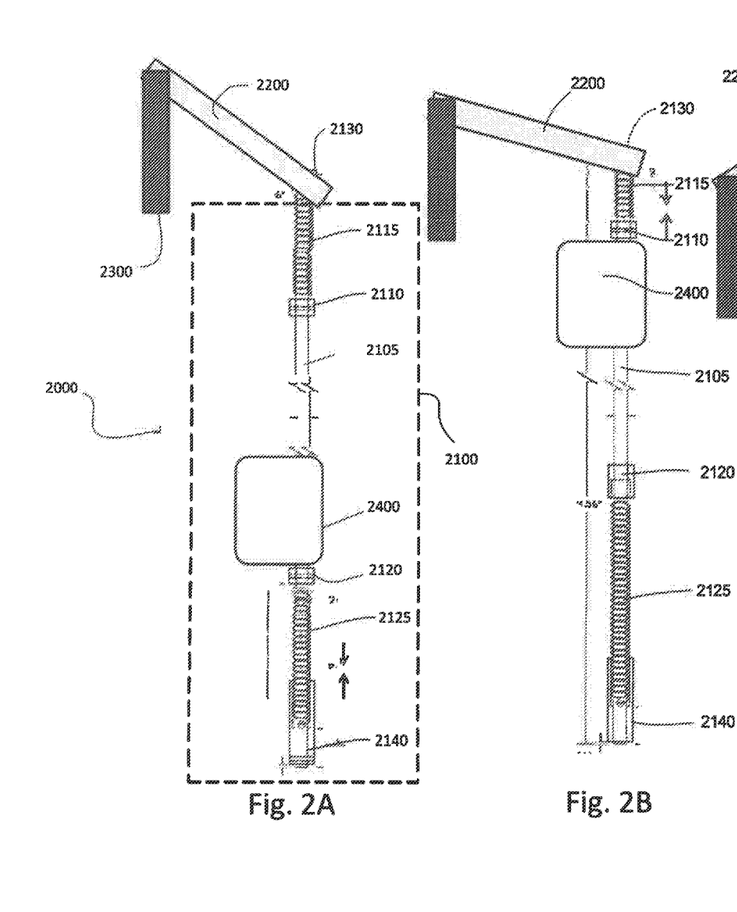
FIGS. 2A to 2C illustrate damper actuation mechanism in different positions.
Figure 2C:
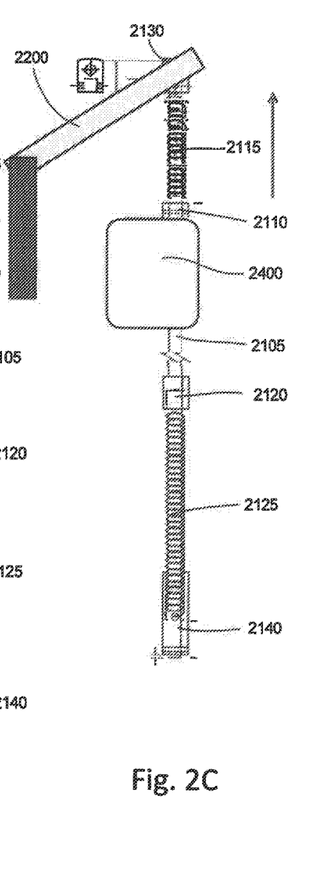

In some embodiments, as shown in FIGS. 2A to 2C, a float actuation mechanism can include a damper actuation mechanism 2000. As noted above, an operating goal of float actuation mechanisms is to ensure efficient landfill gas extraction, by incorporating means to have the submersible landfill pump respond to the water levels inside the pump. The rod in a conventional float actuation mechanism may move so slowly that it doesn't have enough force to flip the rocker arm and could get stuck in position and/or not fully open. Therefore, a damper actuation mechanism illustrated in FIGS. 2A to 2C can be used so that it can allow force of the moving rocker arm to build up using the damper until there is sufficient force to move the rocker arm to the air intake position.

FIGS. 2A to 2C schematically illustrate an exemplary damper actuation mechanism in different positions. In some embodiments, a damper actuation mechanism 2000 can include a float rod assembly 2100, a float 2400, a rocker assembly 2200, and a weight 2300. In some embodiments, the float 2400 can be cylindrically shaped. In the illustrated arrangement, the damper actuation mechanism 2000 dampens portions of the float actuation mechanism, for example, to allow force to build up in the damper for rapid movement of the rod, and to mitigate impact from opening and closing of the rocker assembly 2200. The float rod assembly 2100 includes one or more dampeners 2115, 2125, which can be of any suitable arrangement, such as springs, or gas or liquid dampeners, for example and without limitation. The damper actuation mechanism 2000 in the illustrated arrangement can actuate the rocker assembly 2200 definitively, to and from open and closed positions, by using torque created by the weight 2300 coupled with the rapid expansion force created by compression force in dampeners (e.g., potential energy stored in the spring as the rod 2105 moves upward).

In the example embodiment shown in FIGS. 2A to 2C, the float rod assembly 2100 includes a first dampener contact 2130, a first dampener 2115, a first float rod plunger 2110, a float rod 2105, a second float rod plunger 2120, a second dampener 2125, and a second dampener contact 2140. The float rod 2105, as shown in FIGS. 2A to 2C, can be positioned parallel to the float 2400. In some embodiments, the first dampener contact 2130 can be placed on or near one end the float rod 2105, while the second dampener contact 2140 can be placed on or near the opposite end of the float rod 2105. The first dampener 2115 can be placed between the first dampener contact 2130 and the first float rod plunger 2110. The second dampener 2125 can be placed between the second dampener contact 2140 and the second float rod plunger 2120. In some embodiments, the first and second float rod plungers 2110, 2120 can be configured to be movable along the float rod 2105. For example, float rod plungers 2110, 2120 movable along the float rod 2105 can be used with springs. Due to movement of the float 2400, float rod plungers 2110, 2120 can either compress or expand while abutting against the float 2400. By using springs and having the float rod plungers 2110, 2120 movable along the float rod 2105, one, simple rod can be used instead of requiring an elaborate dampener mechanisms for the first and second dampeners 2115, 2125. In some embodiments, the first and second float rod plungers 2110, 2120 can have a hollow cylindrical shape.

The rocker assembly 2200 can be connected on or near the uppermost portion of the float rod assembly 2100, such that the rocker assembly 2200 pivots due to displacement of the float rod. The weight 2300 can be connected to the rocker assembly 2200, on the opposite end of the portion of the rocker assembly 2200 that is connected to the float rod assembly 2100. In some embodiments, the float 2400 can include a recess or a bore (not shown) into which the float rod is inserted.

The movement of the float 2400 can compress or decompress the first and second dampeners 2115, 2125 to actuate the rocker assembly 2200. FIG. 2A shows the rocker assembly 2200 in a first position. For example, in FIG. 2A, the float contacts the second float rod plunger 2120, thereby compressing the second dampener. The compression force created in the second dampener 2125 can push the float rod 2105 away from the rocker assembly 2200 as the second dampener 2125 expands. As the float rod lowers, the rocker assembly 2200 pivots and the weight 2300 rises. In some embodiments, the weight 2300 of the float 2400 can fully compress the second dampener 2125.

As described above, as the water fills the pump, the buoyant force of the water lifts the float 2400. Once the water reaches a certain level, the float 2400 may lift away from the second float rod plunger 2120. The expansion force from the second dampener 2125 can counteract friction force between the float 2400 and other objects within the pump that contacts the float 2400, and may allow the float 2400 to begin an upward movement earlier and/or smoother than would be possible without the second dampener 2125. For example, the float 2400 may, in some circumstances, contact the float rod 2105 or the casing of the pump, which may prevent the float 2400 from fluidly moving from one position to another. As shown in FIG. 2B, once the water level increases to cause the fluid within the pump to rise to a certain level, the float 2400 in turn may rise and touch the first float rod plunger 2110, causing the first dampener 2115 to begin to compress. As the compression force created in the first dampener 2115 increases with movement of the float rod upward, the combined force from the first dampener 2115 and the water causing the float to lift the float rod 2105 on one side of the rocker assembly 2200, combined with the opposing force created by the weight 2300 on the opposite side of the rocker assembly 2200, eventually is enough to cause the rocker assembly 2200 to pivot more extensively and/or quickly to a position that allow air intake (e.g. FIG. 2C) than would be possible without the first dampener 2115. In some embodiments, the second dampener 2125 also contributes an expensive force that is useful in pivoting the rocker assembly 2200.

In one embodiment, the float rod can be made of stainless steel, or any other suitable material that can withstand repeated use and bending or deformation from external forces. The first and second dampener contacts can be made of plastic, such as PVC. The first and second plungers can be made of plastic, such as PVC. The first and second dampeners can be springs made of a steel having a high yield strength.

In some embodiments, the damper actuation mechanism 2000 is weighted disproportionately such that a separate weight 2300 is not needed to aid in moving the rocker assembly. In other embodiments, the damper actuation mechanism 2000 is evenly weighted across its length and does not include the weight 2300. In some embodiments, the float rod can be located externally to the float. For example, the entire float rod can be located above the float. In some embodiments, the damper actuation mechanism 2000 can include two or more float rods. For example, one float rod can be located above the float, while another float rod can be located below the bottom of the float. In some embodiments, the damper actuation mechanism 2000 does not use a rocker assembly 2200. For example, a valve that opens and closes without pivoting can be used instead of the rocker assembly 2200. In some embodiments, the float and the float rod can be connected. In some embodiments, the damper actuation mechanism 2000 is used with different self-actuating pump mechanisms. For example, the damper actuation mechanism 2000 can be used with a pump using a balloon that expands to open or close the valve.

Submersible Landfill Pump Connections

Figure 3:
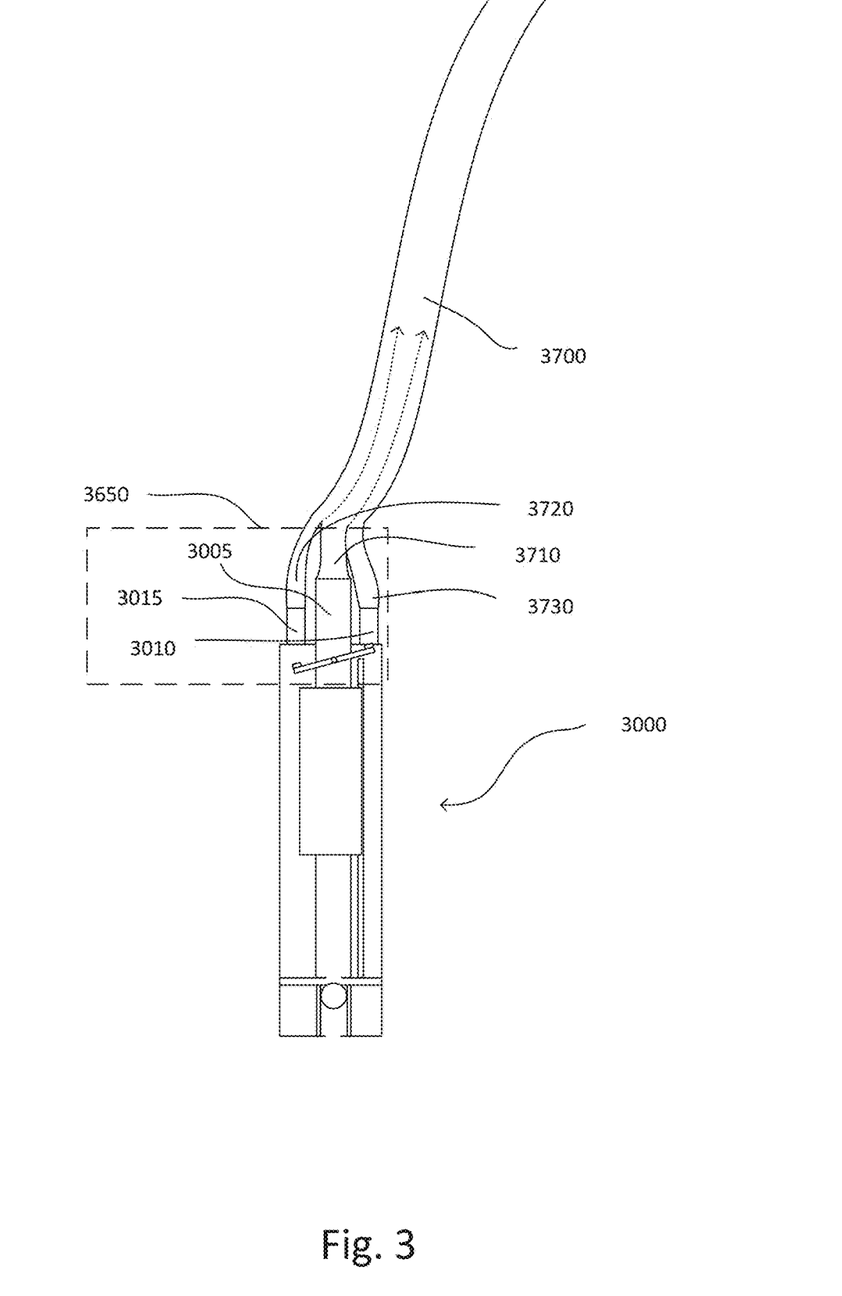
FIG. 3 is a schematic drawing of a submersible landfill pump attached to a sheathed tubing.

FIG. 3 is a schematic drawing of a submersible landfill pump attached to a sheathed tubing that provide inputs and outputs to the submersible pump. During operation, submersible landfill pump systems can discharge liquid from the pump through a fluid discharge tube 3710 to the surface of the landfill. Submersible landfill pump systems also receive air from above the landfill surface to its interior. A tubing that includes a plurality of separate tubes can be used to discharge water while introducing air to the pump at the same time. The tubing can bundle a plurality of tubes through a sheath or a casing. The plurality of tubes, when they are bundled together, have less likelihood of getting tangled with one another, and can be stronger so as to make the tubing suitable for extended use. A sheathed tubing 3700 can include one or more tubes connected to a submersible landfill pump. In one embodiment, the sheathed tubing 3700 includes an air discharge tube 3730, an air intake tube 3720, and a fluid discharge tube 3710. The sheathed tubing 3700 can be connected to a top plug 3650 of the submersible landfill pump. The top plug 3650 may include an air intake port 3010, an air discharge port 3015, and a discharge top assembly 3005.

In one embodiment, as illustrated in FIG. 3, the sheathed tubing 3700 includes the air discharge tube 3730, the air intake tube 3720, and the fluid discharge tube 3710 sheathed along its length, except near the end of the tubing. At the end of the tubing, the tubes spread apart from one another and connect to corresponding ports on the top plug 3650 of the submersible landfill pump. In one embodiment, the air discharge tube 3730 is in fluid communication with the first air port 3010, the air intake tube 3720 is in fluid communication with the second air port 3015, and the fluid discharge tube 3710 is in fluid communication with the discharge top assembly 3005.

In some embodiments, the air discharge tube 3730, the air intake tube 3720, and the fluid discharge tube 3710 are sheathed together so that the space between each tube can be minimal. The minimal space between the tubes can help prevent introduction of foreign substance, such as moisture, mildew, mold, and other chemical or bacterial contaminants that can negatively affect the longevity and operation of the sheathed tubing 3700 and/or the submersible landfill pump system. Each tube may operate independently from one another, such that operation one tube does not interfere with another's. For example, the air discharge tube 3730 can be used for air flow in one direction while the air intake tube 3720 is being used for air flow in the opposite direction. Similarly, the fluid discharge tube 3710 can be used to transport water, while only air is being transported in the air discharge tube 3730 and the air intake tube 3720.

Submersible landfill pump systems may be subject to vibrations or impact. For example, during the operation of the submersible landfill pump system, pumping of water from the pump through the fluid discharge tube 3710 and constant closing and opening of the valve can shake or swing the pump. The pump can also receive external impact from seismic activities or shifting of landfill mass. Such stresses can fracture pump components and the sheathed tubing 3700. Stresses may also cause the tubing to become disconnected from the pump. The sheathed tubing 3700 with a plurality of tubes can be stronger than an individual tube. In one embodiment, as shown in FIG. 9, the sheathed tubing 3700 can comprise a plurality of tubes having similarly-shaped cross-sections. The tubes having similar shapes can be less prone to bending, being tangled up, and other stresses. As such, sheathed tubing 3700 can be suitable for use with the submersible landfill pump for an extended period.

Landfill wells can sometimes be filled with moisture, liquid, bacteria, and other types of harmful chemical pollutants that can corrode or otherwise compromise the integrity of tubes. The sheathed tubing 3700 can be made of any suitable material for operation in landfill well conditions. A suitable material for the sheathed tubing 3700 can resist puncturing, bursting, excessive bending, leaking, and/or corrosion. Such materials may include, for example, metals, such as aluminum, flexible steel alloy, stainless steel, etc.; polymer, such as PVC, polyethylene, polyurethane, rubber, neoprene, etc.; fabric, which can be combinations of metals, polymers, and other fabric materials. In some embodiments, the sheath and the tubes are made of the same material. In some embodiments, the sheath and the tube are made of different materials.

In some embodiments, each individual tube includes one or more smaller tubes. For example, a tube within the sheathed tubing 3700 can include smaller-diameter tubes. The tubes can have a circular cross-section, or any other shape that is suitable for transporting fluid. For example, the sheathed tubing 3700 can include a plurality of tubes having rectangular, triangular, or T-shaped cross sections. Such configurations can be used, for example, in order to minimize the space between each individual tube. In some embodiments, the sheathed tubing 3700 can be an individual tube having partitions. For example, a tube having a cross-shaped partition can provide four independent fluid chambers, and each chamber can connect to individual pump components.

OTHER EMBODIMENTS

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

In describing the present technology, the following terminology may have been used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present invention. Accordingly, the scope of the present invention is intended to be defined only by the claims that follow.

What is claimed is:

1. A dampener actuation mechanism for a submersible landfill pump, the dampener actuation mechanism comprising:
   a rocker assembly; and
   a float rod assembly connected to the rocker assembly, the float rod assembly comprising:
   a rod,
   a float movable along the rod,
   a first dampener positioned below the float; and
   a second dampener positioned above the float and configured to axially compress when pressure is applied to the second dampener by the float rising in the submersible landfill pump due to rise in fluid level within the submersible landfill pump, wherein the second dampener is configured to absorb a first portion of the pressure applied in order to increase pressure applied to the rocker assembly when the pressure applied reaches a threshold level, such that the rocker assembly is moved to an end position in response to the increased pressure applied to the rocker assembly.

2. The dampener actuation mechanism of claim 1, wherein the rod is stainless steel.

3. The dampener actuation mechanism of claim 1, wherein the first and second dampeners comprise steel springs.

4. The dampener actuation mechanism of claim 1, wherein the float is cylindrically shaped.

5. The dampener actuation mechanism of claim 1, wherein the rocker assembly is connected near an uppermost portion of the float rod assembly.

6. The dampener actuation mechanism of claim 1, and further including a weight connected to the rocker assembly.

7. The dampener actuation mechanism of claim 6, wherein the weight is connected to the rocker assembly on an opposite end of the portion of the rocker assembly that is connected to the float rod assembly.

8. A dampener actuation mechanism for a submersible landfill pump, the dampener actuation mechanism comprising:
   a rocker assembly; and
   a float rod assembly connected to the rocker assembly, the float rod assembly comprising:
   a rod;
   a float movable along the rod;
   a first dampener positioned below the float; and
   a second dampener positioned above the float and configured to axially compress due to upward movement of the float to actuate the rocker assembly.

9. The dampener actuation mechanism of claim 8, wherein the rod is stainless steel.

10. The dampener actuation mechanism of claim 8, wherein the first and second dampeners comprise steel springs.

11. The dampener actuation mechanism of claim 8, wherein the float is cylindrically shaped.

12. The dampener actuation mechanism of claim 8, wherein the rocker assembly is connected near an uppermost portion of the float rod assembly.

13. The dampener actuation mechanism of claim 8, and further including a weight connected to the rocker assembly, wherein the weight is connected to the rocker assembly on an opposite end of the portion of the rocker assembly that is connected to the float rod assembly.

14. A dampener actuation mechanism for a submersible landfill pump, the dampener actuation mechanism comprising:
   a rocker assembly; and
   a float rod assembly connected to the rocker assembly, the float rod assembly comprising:
   a rod;
   a float movable along the rod; and
   a dampener positioned above the float and configured to axially compress when pressure is applied to the dampener by the float rising in the submersible landfill pump due to rise in fluid level within the submersible landfill pump, wherein the dampener is configured to absorb a first portion of the pressure applied in order to increase pressure applied to the rocker assembly when the pressure applied reaches a threshold level, such that the rocker assembly is moved to an end position in response to the increased pressure applied to the rocker assembly.

15. The dampener actuation mechanism of claim 14, wherein the rod is stainless steel.

16. The dampener actuation mechanism of claim 14, wherein the dampener comprises a steel spring.

17. The dampener actuation mechanism of claim 14, wherein the float is cylindrically shaped.

18. The dampener actuation mechanism of claim 14, wherein the rocker assembly is connected near an uppermost portion of the float rod assembly.

19. The dampener actuation mechanism of claim 14, and further including a weight connected to the rocker assembly.

20. The dampener actuation mechanism of claim 19, wherein the weight is connected to the rocker assembly on an opposite end of the portion of the rocker assembly that is connected to the float rod assembly.

\* \* \* \* \*

(12) EX PARTE REEXAMINATION CERTIFICATE (11911th)
United States Patent
Cassel et al.

(10) Number: US 10,030,651 C1
(45) Certificate Issued: Sep. 7, 2021

(54) SUBMERSIBLE LANDFILL PUMP

(71) Applicant: Q.E.D. Environmental Systems, Inc., Dexter, MI (US)

(72) Inventors: Mitchal Cassel, Redlands, CA (US); Jamie Tooley, Beaumont, CA (US); Scott Marcell, Banning, CA (US)

(73) Assignee: Q.E.D. ENVIRONMENTAL SYSTEMS, INC.

Reexamination Request:
No. 90/014,490, Apr. 8, 2020

Reexamination Certificate for:
Patent No.: 10,030,651
Issued: Jul. 24, 2018
Appl. No.: 14/629,389
Filed: Feb. 23, 2015

Related U.S. Application Data (60) Provisional application No. 61/943,919, filed on Feb. 24, 2014.

(51) Int. Cl.
*E21B 43/12* (2006.01)
*E21B 47/07* (2012.01)
*B09B 1/00* (2006.01)
*F04F 1/06* (2006.01)
*E21B 47/06* (2012.01)
*B09C 1/00* (2006.01)

(52) U.S. Cl.
CPC .............. *E21B 43/129* (2013.01); *B09B 1/00* (2013.01); *B09B 1/006* (2013.01); *B09C 1/005* (2013.01); *E21B 47/06* (2013.01); *E21B 47/07* (2020.05); *F04F 1/06* (2013.01)

(58) Field of Classification Search
None
See application file for complete search history.

(56) References Cited

To view the complete listing of prior art documents cited during the proceeding for Reexamination Control Number 90/014,490, please refer to the USPTO's public Patent Application Information Retrieval (PAIR) system under the Display References tab.

*Primary Examiner* — Russell D Stormer (57) ABSTRACT

A submersible landfill pump system is disclosed which comprises a damper actuation mechanism that includes a rocker assembly and a float rod assembly comprising one or more dampeners.

US 10,030,651 C1

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 8 and 14 are determined to be patentable as amended.

Claims 2-7, 9-13 and 15-20, dependent on an amended claim, are determined to be patentable.

New claims 21-49 are added and determined to be patentable.

1. A dampener actuation mechanism for a submersible landfill pump, the dampener actuation mechanism comprising:
   a rocker assembly; and
   a float rod assembly connected to the rocker assembly, the float rod assembly comprising:
      a rod,
      a float movable along the rod,
      a first dampener positioned below the float; and
      a second dampener positioned above the float and configured to axially compress when pressure is applied to the second dampener by the float rising in the submersible landfill pump due to rise in fluid level within the submersible landfill pump, wherein the second dampener is configured to absorb a first portion of the pressure applied in order to increase pressure applied to the rocker assembly when the pressure applied reaches a threshold level, such that the rocker assembly is moved to an end position in response to the increased pressure applied to the rocker assembly;
      *a dampener contact located above the float; and*
      *a float rod plunger located on the rod and moveable along the rod, the float rod plunger located below the dampener contact and above the float;*
      *wherein the second dampener is located between the dampener contact and the float rod plunger, and configured to axially compress due to pressure applied to the second dampener through the float rod plunger due to upward movement of the float to actuate the rocker assembly,*
      *wherein the float rod assembly is configured to actuate the rocker assembly by the float being distanced from the float rod plunger and the second dampener, and then the float traveling upwards along the rod due to rise in fluid level within the submersible landfill pump such that the float comes into contact with the float rod plunger to compress the second dampener.*

8. A *submersible landfill pump having a* dampener actuation mechanism for [a] *the* submersible landfill pump, *the submersible landfill pump comprising:* a dampener actuation mechanism comprising:
   a rocker assembly; and
   a float rod assembly connected to the rocker assembly, the float rod assembly comprising:
      a rod;
      a float movable along the rod;
      a first dampener positioned below the float *and configured to axially compress when pressure is applied to the first dampener due to downward movement of the float along the rod due to decreasing fluid level within the submersible landfill pump*; [and]
      a second dampener *comprising a spring, the second dampener* positioned above the float and configured to axially compress *when pressure is applied to the second dampener* due to upward movement of the float *along the rod due to rising fluid level within the submersible landfill pump* to actuate the rocker assembly *to an air intake position;*
      *a dampener contact located above the float; and*
      *a float rod plunger located on the rod and moveable along the rod, the float rod plunger located below the dampener contact and above the float;*
      *wherein the second dampener remains stationary on the rod while the float compresses the first dampener by moving downward along the rod due to decreasing fluid level within the submersible landfill pump,*
      *wherein the second dampener is located between the dampener contact and the float rod plunger, and configured to axially compress due to pressure applied to the second dampener through the float rod plunger due to upward movement of the float to actuate the rocker assembly,*
      *wherein the float rod assembly is configured to actuate the rocker assembly by the float being distanced from the float rod plunger and the second dampener, and then the float traveling upwards along the rod due to rise in fluid level within the submersible landfill pump such that the float comes into contact with the float rod plunger to compress the second dampener.*

14. A dampener actuation mechanism for a submersible landfill pump, the dampener actuation mechanism comprising:
   a rocker assembly; and
   a float rod assembly connected to the rocker assembly, the float rod assembly comprising:
      a rod;
      a float movable along the rod; and
      a dampener positioned above the float and configured to axially compress when pressure is applied to the dampener by the float rising in the submersible landfill pump due to rise in fluid level within the submersible landfill pump, wherein the dampener is configured to absorb a first portion of the pressure applied in order to increase pressure applied to the rocker assembly when the pressure applied reaches a threshold level, such that the rocker assembly is moved to an end position in response to the increased pressure applied to the rocker assembly;
      *a dampener contact above the float; and*
      *a float rod plunger located on the rod and moveable along the rod, the float rod plunger located below the dampener contact and above the float;*
      *wherein the rocker assembly is configured to cause release of pressurized air within the submersible landfill pump due to the rocker assembly being moved to the end position, and*
      *wherein the dampener is:*
         *a spring located on the rod and around the rod, located between the dampener contact and the float rod plunger, and* configured to axially compress when pressure is applied to the dampener through the float rod plunger by the float rising in the submersible landfill pump due to rise in fluid level within the submersible landfill pump,
wherein the float rod assembly is configured to move the rocker assembly to the end position by the float being distanced from the float rod plunger and the float then traveling upwards along the rod due to rise in fluid level within the submersible landfill pump such that the float comes into contact with the float rod plunger to compress the dampener due to rise in fluid level within the submersible landfill pump raising the float.

21. The dampener actuation mechanism of claim 1, wherein a first end of the second dampener is movable relative to the rod.

22. The dampener actuation mechanism of claim 21, wherein a second end of the second dampener opposite from the first end is fixed to the dampener contact.

23. The dampener actuation mechanism of claim 22, wherein the dampener contact is located proximate to a top end of the rod, the top end of the rod located above the float and spaced apart from the float.

24. The dampener actuation mechanism of claim 23, wherein the rocker assembly is pivotally connected to the rod proximate the top end of the rod.

25. The dampener actuation mechanism of claim 21, wherein the float rod plunger is movable relative to the rod.

26. The dampener actuation mechanism of claim 25, further comprising an outer pump casing, the second dampener positioned within the outer pump casing such that a central longitudinal axis of the second dampener is offset from a central longitudinal axis of the outer pump casing.

27. The dampener actuation mechanism of claim 26, further comprising a discharge tube located along the central longitudinal axis of the outer pump casing.

28. The dampener actuation mechanism of claim 27, wherein the float rod plunger comprises a hollow cylindrical shape.

29. The dampener actuation mechanism of claim 28, wherein a top of the float is separated from a bottom of the second dampener and the float rod plunger when the first dampener is compressed by the float.

30. The dampener actuation mechanism of claim 1, wherein the float is movable independently of the second dampener while the float is below a predetermined position on the rod.

31. The dampener actuation mechanism of claim 29, wherein the second dampener remains in contact with the float rod plunger while the float is spaced apart from the float rod plunger.

32. The dampener actuation mechanism of claim 21, wherein the second dampener is compressed in response to movement of the float relative to the dampener contact while the rod remains stationary relative to the dampener contact.

33. The dampener actuation mechanism of claim 21, wherein the rocker assembly is positioned to block an air discharge port when in the end position and positioned to block an air intake port when in a second position.

34. The dampener actuation mechanism of claim 33, wherein the air intake port and the air discharge port are spaced from one another and offset from a central longitudinal axis of an outer casing of the submersible landfill pump.

35. The dampener actuation mechanism of claim 34, wherein the second dampener is a coil spring.

36. The submersible landfill pump of claim 8, wherein: the second dampener remains in contact with the float rod plunger after the float falls out of contact with the float rod plunger due to falling fluid level within the submersible landfill pump.

37. The submersible landfill pump of claim 8, wherein: the float rod plunger has a hollow cylindrical shape, and the float rod assembly is configured to actuate the rocker assembly by the float rod plunger abutting the float as the float rises to cause the second dampener to axially compress due to upward movement of the float to actuate the rocker assembly.

38. The submersible landfill pump of claim 37, wherein the float rod plunger is made of plastic.

39. The submersible landfill pump of claim 8, wherein: the rocker assembly further comprises a weight connected to a first side of the rocker assembly,
the rod is connected to a second side of the rocker assembly, and
combined forces from the second dampener when compressed and the float rising due to rise in fluid level within the submersible landfill pump pushing upwards on the second side of the rocker assembly via the rod, together with a force of the weight pulling down on the first side of the rocker assembly, are sufficient to actuate the rocker assembly.

40. The submersible landfill pump of claim 39, wherein all pressure applied to the rocker assembly through the rod due to the float, sufficient to actuate the rocker assembly, is transmitted through the second dampener.

41. The submersible landfill pump of claim 8, wherein the float rod assembly is configured to actuate the rocker assembly by the second dampener decompressing while the float rod plunger remains in contact with the float.

42. The submersible landfill pump of claim 8, wherein the second dampener is configured to axially compress when pressure is applied to the second dampener by the float rising in the submersible landfill pump due to rise in fluid level within the submersible landfill pump, wherein the second dampener is configured to absorb a first portion of the pressure applied in order to increase pressure applied to the rocker assembly when the pressure applied reaches a threshold level, such that the rocker assembly is moved.

43. The dampener actuation mechanism of claim 14, wherein the dampener remains in contact with the float rod plunger after the float falls out of contact with the float rod plunger due to falling fluid level within the submersible landfill pump.

44. The dampener actuation mechanism of claim 14, wherein the float rod assembly is configured to move the rocker assembly to the end position by the float abutting the float rod plunger due to the float rising due to rise in fluid level within the submersible landfill pump to cause the dampener to axially compress.

45. The dampener actuation mechanism of claim 14, wherein the float rod plunger has a hollow cylindrical shape and is made of plastic.

46. The dampener actuation mechanism of claim 14, wherein:
the rocker assembly further comprises a weight connected to a first side of the rocker assembly,
the rod is connected to a second side of the rocker assembly, and
combined forces from the dampener as compressed and the float rising due to rise in fluid level within the submersible landfill pump pushing upwards on the second side of the rocker assembly, together with a force of the weight pulling down on the first side of the rocker assembly, are sufficient to pivot the rocker assembly to the end position.

47. The dampener actuation mechanism of claim 46, wherein all of the pressure applied to the rocker assembly through the rod due to the float, sufficient to move the rocker assembly to the end position, is transmitted through the dampener.

48. A submersible landfill pump of having a dampener actuation mechanism for the submersible landfill pump, the submersible landfill pump comprising:
 a dampener actuation mechanism comprising:
  a rocker assembly; and
  a float rod assembly connected to the rocker assembly, the float rod assembly comprising:
   a rod;
   a float movable along the rod;
   a first dampener positioned below the float and configured to axially compress when pressure is applied to the first dampener due to downward movement of the float along the rod due to decreasing fluid level within the submersible landfill pump;
   a second dampener comprising a spring, the second dampener positioned above the float and configured to axially compress when pressure is applied to the second dampener due to upward movement of the float along the rod due to rising fluid level within the submersible landfill pump to actuate the rocker assembly to an air intake position;
   a dampener contact located above the float; and
   a float rod plunger located on the rod and moveable along the rod, the float rod plunger located below the dampener contact and above the float,
  wherein the second dampener remains stationary on the rod while the float compresses the first dampener by moving downward along the rod due to decreasing fluid level within the submersible landfill pump,
  wherein the second dampener is located between the dampener contact and the float rod plunger, and configured to axially compress due to pressure applied to the second dampener through the float rod plunger due to upward movement of the float to actuate the rocker assembly,
  wherein the float rod assembly is configured to actuate the rocker assembly by:
   moving the float upwards along the rod in response to rise in fluid level within the submersible landfill pump before the float comes into contact with the float rod plunger, and then making contact between the float rod plunger and the float due to the float moving further upwards along the rod in response to further rise in fluid level within the submersible landfill pump;
   axially compressing the second spring dampener due to the float moving upwards along the rod, while the float remains in contact with the float rod plunger, in response to rise in fluid level within the submersible landfill pump;
   actuating the rocker assembly by pivoting the rocker assembly due to force from the second dampener and the float and
   moving the float downwards along the rod in response to decrease in fluid level within the submersible landfill pump so that the float falls out of contact with the float rod plunger.

49. A submersible landfill pump having a dampener actuation mechanism for the submersible landfill pump, the submersible landfill pump comprising:
 a dampener actuation mechanism comprising:
  a rocker assembly; and
  a float rod assembly connected to the rocker assembly, the float rod assembly comprising:
   a rod;
   a float movable along the rod;
   a dampener placed on the rod at a location that is on or near a top end of the rod, the dampener positioned above the float and configured to axially compress when pressure is applied to the dampener by the float rising in the submersible landfill pump due to rise in fluid level within the submersible landfill pump, wherein the dampener is configured to absorb a first portion of the pressure applied in order to increase pressure applied to the rocker assembly when the pressure applied reaches a threshold level, such that the rocker assembly is moved to an end position in response to the increased pressure applied to the rocker assembly;
  wherein the float rod assembly is configured to move the rocker assembly to the end position by:
   moving, while the dampener remains placed at the location on the rod, the float upwards along the rod in response to rise in fluid level within the submersible landfill pump while the dampener remains stationary along the rod and uncompressed, and then axially compressing the dampener in response to the float moving further upwards along the rod in response to further rise in fluid level within the submersible landfill pump;
   pivoting the rocker assembly to the end position due to force from the float and the dampener acting on the rocker assembly; and
   moving the float downwards along the rod in response to decrease in fluid level within the submersible landfill pump such that the float falls away from the dampener and the dampener decompresses while the dampener remains placed at the location on the rod.

\* \* \* \* \*